Jan. 19, 1937.  T. DE PORT  2,067,904
COWLING ATTACHMENT
Filed March 2, 1932
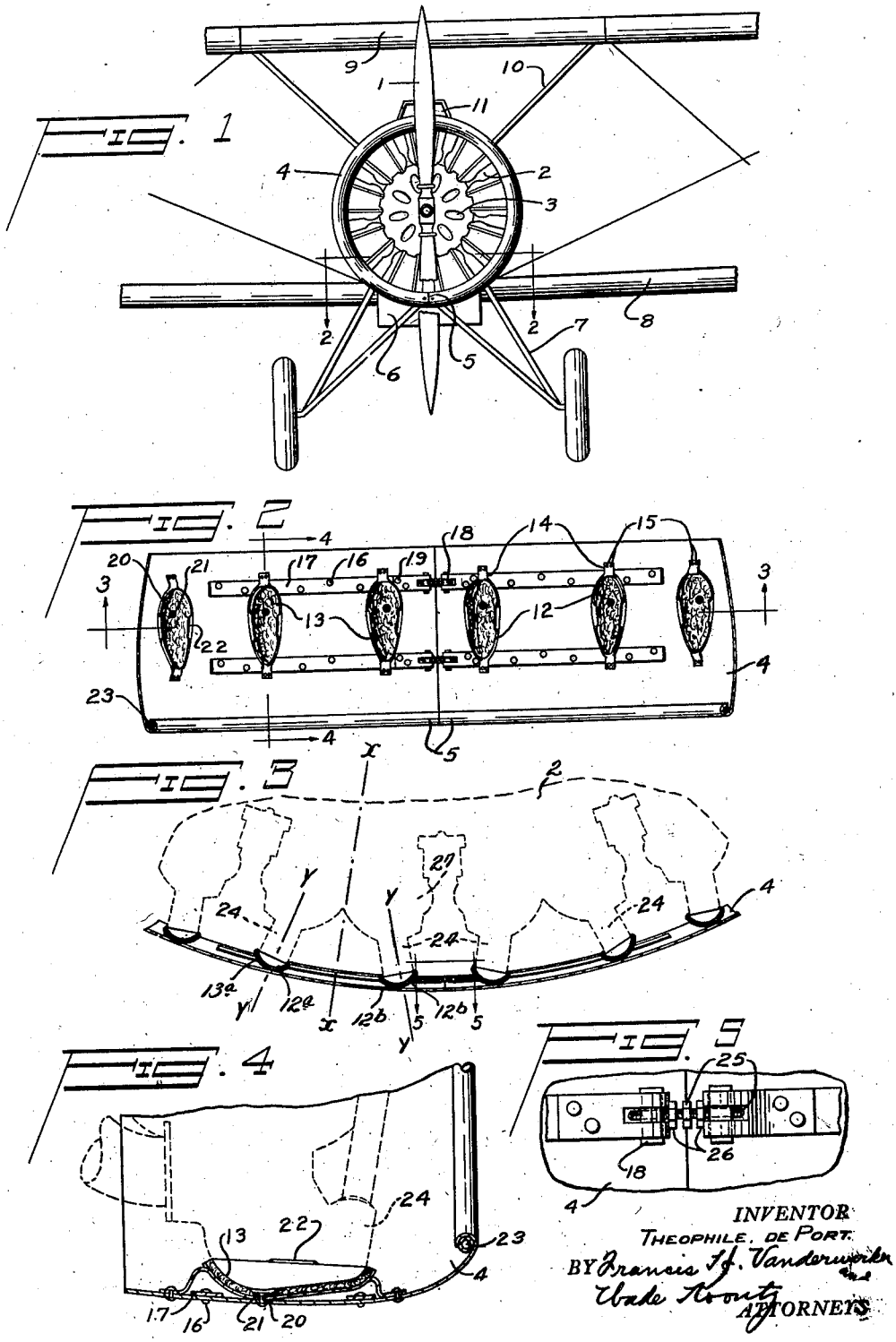
INVENTOR
THEOPHILE. DE PORT.
BY Francis J. Vanderwerker
Unde Koontz
ATTORNEYS Patented Jan. 19, 1937

2,067,904

UNITED STATES PATENT OFFICE 2,067,904

COWLING ATTACHMENT

Théophile de Port, New Carlisle, Ohio

Application March 2, 1932, Serial No. 596,275

3 Claims. (Cl. 244—31)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in annular cowlings for radial engines and more particularly to a novel means for attaching same.

Radial engine cowlings are subject to two principal sources of disturbance; engine vibrations transmitted through their supporting structures and aerodynamic reactions set up during flight. If any given arc of cowling be considered as detached from the whole and the resultants of the aforesaid disturbances be plotted upon the frontal plan thereof, it is at once apparent that there is a marked tendency of the arc of cowling to creep in either a clockwise or counter-clockwise direction, depending upon the direction of engine rotation.

It is common practice to attach cowlings located at the periphery of radial engines to the cylinder heads of said engines by means of fixed brackets, or to attach said cowlings to portions of the engine mounts, nacelle structures or fuselage structures by means of fixed auxiliary structures. In the case of the former method of attachment, engine vibrations are transmitted directly to the engine cowling, causing early failure of the cowling at local points of attachment to the engine. In the case of the latter method of attachment, complicated and heavy auxiliary structures have to be utilized to assure adequate support for the engine cowling.

It is an object of this invention to provide in a cowling of this character a novel means whereby the cowling may be directly connected to the periphery of a radial aircraft engine in such a manner that combined engine vibration and aerodynamic reaction under normal flying conditions will not cause early failure of the cowling at local points of attachment to the engine.

It is a further object of this invention to provide in a cowling of the character described a novel means associated with each cylinder head and the cowling immediately adjacent thereto, consisting of two cup shaped retainers lined with suitable padding, into which the two valve housings of said cylinder head seat, preventing accidental loss of the cowling during flight.

It is a further object of this invention that the cup-shaped retainers referred to above conform in inner contour with the outer contour of the valve housings in order that maximum resiliency be retained per unit area of felt compressed therebetween.

It is a still further object of this invention to provide in a cowling of this character a novel means for quickly attaching or releasing the cowling to or from the periphery of a radial aircraft engine to overcome the serious obstacle which all cowlings installed at the periphery of radial engines by means of rigid brackets fixed directly to the engine cylinders or to the engine mounts, nacelle structures or fuselage structures by means of rigid auxiliary structures, offer to routine maintenance of such engines.

With the foregoing and other objects in view, which will appear as the description proceeds, the invention consists of certain new and novel arrangement of parts which will be hereinafter more fully illustrated and described in the accompanying drawing and more particularly pointed out in the appended claims.

Referring to the drawing, in which numerals of like character designate similar parts throughout the several views:

Fig. 1 is a partial front view of an airplane showing an annular cowling installed at the periphery of the engine;

Fig. 2 is a sectional view taken on the line 2—2 of Fig. 1;

Fig. 3 is a sectional view taken on the line 3—3 of Fig. 2;

Fig. 4 is a sectional view taken on the line 4—4 of Fig. 2; and

Fig. 5 is a sectional view taken on the line 5—5 of Fig. 3.

For purposes of simplifying the description of the invention, application of the invention has been made to a single engined biplane. Where aircraft are powered by more than one engine, necessitating installation of the engines outboard of an airplane fuselage or an airship car, the method of cowling attachment is identical to that described hereinafter. The adjusting portion of the securing and releasing means will be so located with respect to the fuselage or control car that maximum accessibility is afforded to personnel servicing the aircraft.

In Fig. 1, a propeller 1, a radial engine 2, an inner engine cowling 3, and an outer or annular cowling 4 are attached to the forward end of a fuselage 6. It will be noted that the lower portion of the cowling 4 has been cut through to form two ends 5. There are also attached to the fuselage 6 a landing gear 7, lower wings 8, a center section 9, cabane struts 10 and a windshield 11.

Fig. 2 shows an enlarged view of the manner of securing retaining cups 12 and paddings 13 to the cowling 4. Mounting lugs 14 of the cups 12 are fixed to the cowling 4 by means of rivets 15. There are also fixed to the cowling 4, by means of rivets 16, retaining straps 17. The lower ends of the retaining straps 17 are looped over trunnions 18 and fixed to the ends 5 of the cowling 4 by means of rivets 19. The paddings 13 are fixed to the retaining cups 12 by means of rivets 20, washers 21 and bent over lugs 22 of the retaining cups 12. The leading edge of the cowling 4 is formed securely about a reinforcing tube 23.

Fig. 3 shows an enlarged skeleton front profile of the lower cylinder 27 of the radial engine 2. Lateral relationship of the retaining cup 12 and the paddings 13 with respect to the valve housings 24 forming the outer-most portion of cylinder 27 is clearly shown. It will be noted that the faces of the cups 12a and 12b are turned inwardly with respect to the longitudinal axis $x$—$x$ of the cylinder 27 so that the faces of the cups or the perimeters thereof lie in a plane substantially parallel to the tangent of the cowling at the point of attachment of the cup to the cowling as shown in Figs. 2 and 4, and that the axes of symmetry $y$—$y$ of each of the cups intersect substantially at the longitudinal axis of the assembled cowling. With this arrangement, each cup will conform as nearly as possible with the outer contour of the valve housings to thereby obtain a maximum area of contact and, consequently, maximum resistance to creeping of the cowling in all directions.

Fig. 4 shows a still further enlarged skeleton side profile of one of the lower cylinders of the radial engine 2. The longitudinal relationship of the cowling 4, the valve housing 24, the retaining cup 12 and the padding 13 is clearly shown. The method of forming the leading edge of the cowling 4 about the reinforcing tube 23, as well as the relationship of the rivets 16, retaining straps 17, rivets 20 and washer 21 to the cowling 4, and to the retaining cup 12 and the padding 13, are also clearly shown.

Fig. 5 shows a still further enlarged plan view of the inner extremities of two of the four retaining straps 17. The ends 5 of the cowling 4 are adjusted in peripheral relationship one to the other by means of the retaining screw 25, the central portion of which has been formed into a hexagonal nut. When the desired adjustment has been obtained, the retaining screw 25 is secured in a fixed relationship with respect to the straps 17 by screwing the check nuts 26 firmly against the looped portions of said straps.

To install the assembled cowling upon a radial engine, the cowling is first slipped over one of the blades of the propeller 1. The ends 5 of the cowling are next separated, after removal of the screws 25, slipped past the remaining propeller blade and the cowling as a whole loosely placed over the cylinders of the engine. Following alignment of the retaining cups 12 and paddings 13 with the cam-shaft housings 24, the retaining screws 15 are inserted in the trunnions 18 of the retaining straps 17 and the open ends 5 of the cowling, gradually contracted until desired tension between the valve housings 24 and the paddings 13 is obtained. The last named operation secures the cowling as a whole to the radial engine in floating relation, after which the retaining screws are locked against rotation by the check nuts 26.

I claim:

1. In a split annular cowling of the type adapted to be disposed about the periphery of the cylinders of a radial aircraft engine, a plurality of members conforming to the valve housing laterally and longitudinally carried by said cowling and having paddings disposed therein for engagement with the valve housings of said cylinders, said members being so constructed and arranged as to cooperate with said cowling when clamped about said engine cylinders to floatingly support said cowling thereon and to limit the relative movement therebetween in all directions.

2. In a split annular cowling of the type adapted to be disposed about the periphery of the cylinders of a radial aircraft engine, a plurality of cup-shaped members carried by said cowling and having paddings disposed therein adapted for engagement with the valve housings of said cylinders, said members being so disposed and arranged with respect to one another as to individually and collectively resist creeping of said cowling substantially throughout the periphery of said engine, and means for floatably adjustably clamping said cowling to said engine.

3. In a split annular cowling of the type adapted to be disposed about the periphery of the cylinders of a radial aircraft engine, a plurality of pairs of cup-shaped members disposed about the inner peripheral surface of said cowling, the cups of each pair of members being equally angularly disposed with respect to the longitudinal center line of said cylinders and having paddings secured therein for engagement with the valve housings of said cylinders, and means for floatably adjustably clamping said cowling to said engine in such a manner that said cups individually and collectively resiliently resist peripheral creeping of said cowling with respect to said engine in all directions.

THÉOPHILE DE PORT.